Feb. 27, 1940. O. I. JUDELSHON 2,191,531
VARIABLE SPEED DRIVE
Filed April 22, 1936
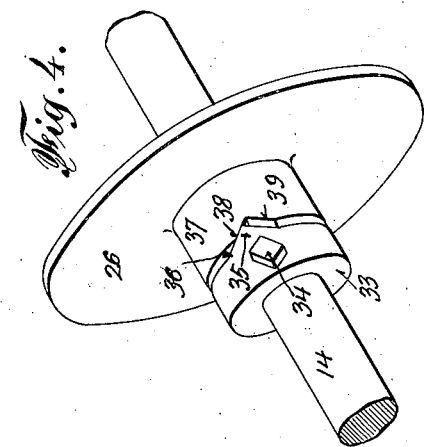

Patented Feb. 27, 1940

2,191,531

UNITED STATES PATENT OFFICE 2,191,531

VARIABLE SPEED DRIVE

Oscar I. Judelshon, Park Ridge, N. J.

Application April 22, 1936, Serial No. 75,701

1 Claim. (Cl. 74—230.17)

In my Letters Patent No. 2,035,269, I showed and described a variable speed drive by means of which the driven member may be operated throughout a wide variation of speeds from a driving member such as a motor; and in the present case I have shown the principal parts of the device illustrated in said patent, although it will be understood that my present invention is not limited to an embodiment which includes the features of the said patent.

In variable speed drives wherein belts of the V type having divergent side surfaces engage with flange members of expanding pulleys, there is a tendency for one or both of the belts to become slack and to whip under certain conditions of operation, and the object of the present invention is to avoid such results and to keep the belts of the drive under proper tension and to prevent whipping of the belts under all conditions of operation of the drive.

I accomplish this result by providing means which act in the nature of a cam or cams for crowding or pushing the flange members toward each other in order to obtain sufficient traction between the belts and the flanges of the pulleys, and also to prevent slack in the belts and the whipping action referred to. In the fullest embodiment of my invention I employ two cam-like devices, each one acting on one of the end flanges of a combined expansible pulley device which includes two adjacent expansible pulleys having a common intermediate flange.

Furthermore, I prefer to have a different angle of inclination of the cam members on which the different V type belts operate in order that the two end flange members of the combination expansible pulley will have approximately the same movement, each to the other, in order to maintain the center lines of the belts in the same lines during variation of conditions of operation.

The cam means for urging the flanges of the pulleys toward each other is adapted to perform the same function when the driving means, such as the motor, is operating clockwise or counterclockwise. Thus, regardless of the reversal of the direction of the motor or other source of power which may be necessary for driving different types of machines, the cam means referred to herein for maintaining the belts tightly engaged with their pulleys operates effectively whether the source of power is turning clockwise or counterclockwise.

Another feature of my invention is that the lateral pressure applied to the belts varies in accordance with the torque or in other words the greater the load on the drive the more lateral pressure there is on the belts, and vice versa, when the load is light the lateral pressure is correspondingly lighter and when the drive is idling or not carrying a load the lateral pressure of the flanges on the belts will be very light, so that there will be no unnecessary wear upon the pulleys and on the bearings of the various shafts of the drive.

The present device is very simple and inexpensive in construction and it is also durable and it will not require any special attention when once set up for operation. Other features of my invention will be set forth in the following detailed description.

In the drawing forming part of this application,

Figure 1 is a plan view of a variable speed drive similar to that shown in my said patent but with my present invention applied thereto, Figure 2 is an elevation of the same, Figure 3 is a sectional view on the line 3—3 of Figure 2, Figure 4 is a perspective view of one of the flanges of the expansible pulleys and showing the cam means for urging the flange in a lateral direction, Figure 5 is a perspective view of a portion of another of the flange members wherein the cam surface is formed at a different angle to that shown in Figure 4, and Figure 6 is a perspective view of one of the cam members.

I have shown the variable speed drive mounted on a base or platform 1. On this platform I have shown a motor 2 as a source of power although it will be understood that any other source of power may be used to operate the drive. On the shaft of the motor I have shown a pulley 3 of the V type having opposed flanges provided with frusto conical surfaces which engage with an endless belt 4 of the V type, that is, having inclined or converging side edges 5. The driven member, arranged at the opposite end of the base, is shown as a pulley 6 which also has flanges provided with frusto conical faces and the endless belt 7 which is also of the V type, travels around this pulley to drive the shaft 8 and from this shaft power may be applied to any machine or device which is to be driven at different speeds. These two belts 4, 7 which are in parallel planes operate at all times in the positions shown, that is to say, there is no change in the center lines of these belts during the operation of the device, regardless of variations in the speed of the driven member.

On the base I have shown mounted in laterally spaced relation, brackets 9 having hubs 10 which support a laterally extending shaft 11 which is adapted to rock in the bearings.

Mounted on and fixed to this shaft there are two rocking arms 12 which are spaced slightly from the brackets 9 in order to permit the shaft 11 to have a slight movement in the direction of its axis for a purpose which will appear hereinafter.

The upper or free ends of the arms 12 have bosses 13 in which there are journaled the opposite ends of a shaft 14 on which the expansible pulleys are mounted. The lower shaft 11 is shown as provided with a cam 15 having a cam groove 16 disposed at an angle to the axis of the shaft 11; and on a stationary bracket 17 which is fixed to one of the brackets 9 there is carried a pin 18 which engages in the groove 16 so that when the shaft 11 is oscillated, the pin and cam will cause the shaft to be shifted in the direction of its axis.

One of the arms 12 is projected upwardly in the form of a lever arm 19 provided with a handle 20 at its upper end. One of the brackets 9 is provided with a toothed segment 21 with which the locking pin 22 engages to lock the arms 12 in different positions of adjustment in their movement about the axis of the shaft 11. This locking pin is on the lower end of the rod 23 which is bent outwardly to pass the shaft 14 and it extends upwardly along one side of the lever arm 19 where it is secured by ears 24 in a manner to permit the rod to move lengthwise in the lever arm and the upper end of the rod is provided with an operating hand lever 25 adjacent the handle 20 by means of which lever the lever arm 20 may be released to permit it to be swung to the right or left in Figure 2. These elements are all disclosed in my said Letters Patent to which reference may be had for further details.

On the shaft 14 I have mounted a plurality of expansible pulleys, one for each of the belts 4, 7 and these pulleys are preferably adjacent to each other with a common intermediate flange.

For instance, I have shown an end flange member 26 at the left in Figure 3, this member having a frusto conical face 27 for engaging one of the inclined edges of the belt 7. Spaced from this flange there is a right hand flange 28 which also has a frusto conical face 29 facing to the left in Figure 3, and this face engages one of the slanting edges of the belt 4 both belts being of the V type.

Between the two flange members just described I mount an intermediate flange member 30 which is common to both expansible pulleys. For this reason it has a frusto conical surface 31 on the left hand side in Figure 3 which engages the edge of the belt 7 opposite to that engaged by the flange member 26. It has another frusto conical surface 32 facing to the right and adapted to engage one slanting edge of the belt 4 opposite to that engaged by the flange member 28. The intermediate flange member 30 is adapted to move slightly lengthwise on the shaft 14 and it may be keyed thereto or it may be loose on the shaft, as shown in Figure 3, but in either event it will revolve with the shaft because it is engaged by both of the belts. The endmost flange members 26, 28 are not connected directly with the shaft 14 although mounted thereon, but they are connected through a cam device as follows:

There is a collar 33 fitted over the shaft 14 and lying close to the flange member 26 the collar being secured or fastened to the shaft in any desired manner such as by the set screw 34. This collar, therefore, revolves at all times with the shaft. The collar is provided with a projection and preferably with two projections disposed opposite each other or 180° apart, the projections being numbered 35 and having two slanting surfaces 36 disposed in angular relation to each other.

The hub 37 of the flange member 26 is provided with recesses or notches 38 at the end, preferably shaped with slanting edges 39 to receive the projections 35 of the collar therein, and preferably the angle between the edges 36 corresponds with the angle between the slanting surfaces 39, so that when the projections are pressed completely into the recesses the edges of both the projections and recesses are parallel with each other.

I have shown another collar 40 which is also fixed to the shaft 14 such as by the set screw 34 and this collar also has preferably oppositely disposed projections 43 having inclined surfaces but in this instance the angle of the inclined surfaces is somewhat different to that of the projections of the collar 33 shown in Figure 4. The hub 41 of the flange 28 is also provided with notches or recesses 38 on its end and the inclined surfaces 42 of these notches are preferably formed at the same angle as the inclined surfaces of the projections 43 on the collar 40. The belt 4 will generally travel at a higher speed than the belt 7 and therefore I prefer to make the angle of the edges 36 in Figure 4 more obtuse than the angle of the edges 42 in Figure 6. By way of example I would say that if the angle between the edges 42 is 80° I prefer to make the angle between the edges 36, 60°, although I do not wish to be understood as limiting my invention to these exact angles.

The point is that the more obtuse angle is preferably used in conjunction with the flanges which engage the belt 4 which is operating at high speed and to form the edges 36 at a more acute angle because these co-operate with the flange which engages the belt 7 which is generally operating at a relatively lower speed than the belt 4.

I have found that by employing a difference in angle as between the two cam devices corresponding more or less with the difference in relative speeds of the two belts that in the operation as hereinafter described the oppositely disposed outer flange members 26, 28 will be moved toward each other and each will be moved the same distance so that the center lines of the two belts remain constantly in the same position.

*Operation*

In order to vary the speed ratio between the driving and driven members the handle 20 is grasped and the finger lever 25 is operated to withdraw the locking pin 22 from the toothed sector 21 to unlock this lever, whereupon by swinging the lever arm 19 to the right or left in Figure 2 the shaft 14 will be moved toward the driven member and away from the driving member and when the lever arm 19 is moved to the left the shaft 14 is moved towards the driving member and away from the driven member. When the lever arm 19 is moved towards the right in Figure 2, the several flange members will be so moved in relation to each other by the shifting of the position of the shaft 14 that the loop where the belt 7 engages between the flange members 26, 30 will be enlarged because the two flange members 26, 30 will be moved closer to each other. At the same time the flange members 28, 30 will be moved further apart so that the loop of the belt 4 where it passes around the flange members 28, 30 w.ll be decreased in size. This adjustment, therefore, decreases the speed of the driven member in relation to the driving member.

Conversely, when the lever arm 19 is moved to the left in Figure 2, the opposite action will take place so that the loop of the belt 7 where it passes around the flange members 26, 30 will decrease in size, due to the spreading apart of the flange members 26, 30 and the loop of the belt 4 where it passes around the flange member 28, 30 will increase in size due to the crowding together of the flange members 26, 30 of one expansible pulley.

Whenever the lever arm 19 is moved to a new position the finger lever 25 is released so that the pawl 22 engages between teeth of the sector 21 to lock the parts in the adjusted positions.

The above operations are for the purpose of varying the speed ratio as between the driving and driven members and it corresponds with the operation of the drive shown in my said patent. During the operation of the device, and regardless of the adjustment effected by the lever 19 to vary the speed ratio between the driving and driven members, the flange members 26, 28 which are themselves loose on the shaft 14, will be driven through the collars 33, 40 by reason of the engagement of the projections 35 in the recesses 39, and the engagement of the projections 43 in the recesses 41. A torque action thus results as between the respective collars and the outer flange members, and this torque action has the effect of causing the inclined projections 35 to act on one of the edges 38 to force the flange member 28 upwardly in Figure 1 and it also has the effect of causing the projections 43 to act on one of the slanting edges 42 of each recess in the hub 37 and thus apply a lateral pressure to the flange member 26 urging it downwardly in Figure 1.

The particular edges on which the projection 35 creates the lateral pressure on the flange member 28 and also the particular edge on which the projection 41 engages to move the flange members 26 downwardly depends on the direction of operation of the motor. That is to say, when the motor is moving clockwise, as viewed in Figures 1 and 2, the projections 35 will operate on the edges at one side of the recesses in the hub 37, whereas when the motor operates counter-clockwise in Figures 1 and 2 the edges of the projections 35 will act on the opposite edges of the hub 37 because the torque as between the flange member 26 and the collar is reversed when the direction of the motor is reversed. The same is true of the projections 41.

From what has been described it will be apparent that the cam devices represented by the projections and the recesses will be effective regardless of which direction the motor is operating so that my device permits the motor to be reversed in direction and the lateral pressure to be applied as described herein.

The effect of the cam action on the two outer pulley flanges 26, 28 is to crowd these flange members toward each other to apply lateral pressure as between the members of the expansible pulleys and the slanting side edges of the two belts 4, 7 so that there will be ample traction between the belts and expansible pulleys to permit the drive to operate the driven member regardless of the load placed upon the driven members up to the capacity of the drive. This crowding action on the outer flange members not only insures ample traction between the belts and the expansible pulleys but it also serves to keep both runs of each belt taut so that there is no whipping action of either belt while the drive is in operation.

The lateral pressure upon the belts by the flanges of the expansible pulleys is varied automatically in accordance with the load or the power to be applied to the driven member. Obviously if there is no load on the driven member 6 there will be slight torque between the flange members 26, 28 and the collars 33, 40 and therefore there will be very light lateral pressure applied to the belts by the cam devices. When the device is running idle, therefore, or carrying no load, there is very slight lateral pressure on the belts so that at such times there is very little wear as between the belts and the pulleys and there is very little wear on the bearings of the several shafts.

When the load on the driven member is increased, as for instance, when some machine is driven by it, and especially when the variable drive is adjusted to operate the driven member at relatively high speed, then the torque as between the outer flanges 26, 28 and the collars 33, 40 will be proportionately increased and this will increase the lateral pressure upon the outer flange members 26, 28 and thereby increase the traction between the belts and the members of the expansible pulley. This increased pressure is necessary to obtain a greater degree of traction between the belts and the pulleys in order for the drive to operate the increased load referred to. From this it will be apparent that the lateral pressure on the belts varies automatically as the load on the driven member increases or decreases.

The lateral movements of the outer flange members for applying the lateral pressure to the belts is very slight and therefore there is no substantial change in the diameters of the loops of the belts around the expansible pulleys.

As the belt 4 usually travels faster than the belt 7 I have inclined the edges of the notches in the hub 41 at a wider angle than the angle between the edges of the notches in the hub 37 because I have found that in this manner the faster moving belt will apply an upward pressure to the flange member 28 in Figure 1 which will be about equal to the downward pressure of the flange member 26 in Figure 1 so that the center lines of the two belts will not be shifted laterally. In other words, the two outer flanges will be moved toward each other with about equal pressures notwithstanding the difference in speed between the two belts. This is desirable because if one outer flange member were pressed laterally with greater force than the other, it would tend to throw the belts out of alignment.

As stated above, the cam devices are effective regardless of whether the motor or other source of power is operating clockwise or counterclockwise. The cam devices are also effective regardless of the adjustment of the position of the shaft 14 to vary the speed ratio as between the driving and driven members. In other words, the cam action is effective in all positions of the shaft 14 and it is independent of the relative positions of the three flange members. I do not wish to limit my invention to the particular cam means shown herein for applying the lateral pressure to the outer flange members, although the cam means shown herein is of very simple construction.

If desired, the cam device may be applied to only one of the flanges 26, 28 since the lateral movement of one of these flanges will apply lateral pressure to both belts because the intermediate flange 30 floats between the two belts. However, I prefer to employ the cam device for each outer flange 26, 28 in order to move both flanges inwardly or towards the intermediate flange 30 in order to retain the belts as near as possible in the same paths. In other words, by producing the lateral pressure by movement of both outer flanges instead of having one remain stationary and the other perform all of the lateral movement, there is less tendency to throw the belts out of alignment. In any case, the movement of the end flange members to effect the result described herein is very slight.

Having described my invention, what I claim is:

In a variable speed power transmission mechanism, driving and driven pulleys rotatable on parallel axes, a shaft rotatable on an axis parallel of the pulleys, expansible belt groove forming pulley means on said shaft including a pair of end flange members each having a hub portion with a diametrical V recess in the end loosely engaged on the shaft and a flange member slidable on the shaft intermediate of and forming with said end flange members a pair of belt engaging grooves, a belt travelling around the driving pulley and belt groove formed by one end flange member and the intermediate flange member, a belt travelling around the driven pulley and the other belt groove formed by the other end flange member and the intermediate member, and collars fixed on the shaft opposed to the ends of the hubs of the end flange members having diametrical V projections to engage the V recesses in said hubs to couple the end flange members to the shaft and permit of oscillatory and axial movements of said end flange members on the shaft and adapted to have independent oscillatory and axial movements on the shaft to apply lateral pressure to the belts by and in accordance with the torque in the belts.

OSCAR I. JUDELSHON.